United States Patent
Ryu

(10) Patent No.: US 6,951,151 B2
(45) Date of Patent: Oct. 4, 2005

(54) MANUAL TRANSMISSION SHIFTING DEVICE

(75) Inventor: Seung-Doon Ryu, Chungcheongbuk-do (KR)

(73) Assignee: Hyundai Motor Company, Seoul (KR)

(*) Notice: Subject to any disclaimer, the term of this patent is extended or adjusted under 35 U.S.C. 154(b) by 118 days.

(21) Appl. No.: 10/299,875

(22) Filed: Nov. 18, 2002

(65) Prior Publication Data

US 2003/0097896 A1 May 29, 2003

(30) Foreign Application Priority Data

Nov. 28, 2001 (KR) ........................................ 2001-74536

(51) Int. Cl.[7] .............................................. B60K 20/00
(52) U.S. Cl. .............................. 74/473.34; 74/473.33; 180/336
(58) Field of Search ...................... 74/473.33, 473.34, 74/473.35, 471 XY; 180/336, 315

(56) References Cited

U.S. PATENT DOCUMENTS

| | | | |
|---|---|---|---|
| 4,085,812 A | | 4/1978 | Robinson et al. |
| 4,491,032 A | | 1/1985 | Saito et al. |
| 4,507,980 A | | 4/1985 | Nishiyama et al. |
| 4,509,384 A | * | 4/1985 | Lamy et al. ............. 74/473.33 |
| 4,653,341 A | | 3/1987 | Ferrario |
| 4,712,640 A | * | 12/1987 | Leigh-Monstevens et al. ... 180/336 |
| 4,873,883 A | * | 10/1989 | Andre ...................... 74/473.34 |
| 5,125,285 A | | 6/1992 | Sagara |
| 5,321,993 A | | 6/1994 | Herzog et al. |
| 5,456,131 A | | 10/1995 | Nakamura et al. |
| 5,560,253 A | * | 10/1996 | Ishikawa et al. ........... 74/473.3 |
| 5,743,148 A | | 4/1998 | Na |
| 5,813,285 A | * | 9/1998 | Niimi ........................ 74/473.3 |
| 5,842,384 A | | 12/1998 | Berger |
| 5,927,151 A | | 7/1999 | Alber et al. |
| 6,044,724 A | | 4/2000 | Timms |
| 6,109,414 A | | 8/2000 | Tomida et al. |
| 6,164,427 A | | 12/2000 | Ogawa |
| 6,435,054 B1 | * | 8/2002 | Duckeck et al. ......... 74/473.34 |

FOREIGN PATENT DOCUMENTS

FR    2676843    * 11/1992

* cited by examiner

*Primary Examiner*—David M. Fenstermacher
(74) *Attorney, Agent, or Firm*—Morgan Lewis & Bockius LLP

(57) ABSTRACT

A manual transmission shifting device in which a shifting force is transmitted only by a first rod from a shift lever to a transmission and the shifting force transmitted to the first rod is supplied to the transmission via a simple mechanical link system, such that the number of components is reduced, thereby improving the efficiency of transmitting the shifting force to a transmission.

14 Claims, 4 Drawing Sheets

--------- SELECTING OPERATION
————— SHIFTING OPERATION

- - - - - - - SELECTING OPERATION
———————— SHIFTING OPERATION

MANUAL TRANSMISSION SHIFTING DEVICE

FIELD OF THE INVENTION

The present invention relates to a manual transmission shifting device, and more particularly, to a manual transmission shifting device for heavy-duty vehicles.

BACKGROUND OF THE INVENTION

When an operator (or driver) manipulates a shift lever in a manual transmission vehicle, shifting force is transmitted to a transmission gear box to shift a gear. In a small compact car, this shifting force is typically transmitted via a cable. However, in heavy-duty vehicles such as buses, trucks or the like, the shifting force is transmitted to the transmission via a plurality of link members. This is because the components to be shifted are large and heavy, and the distance covered by the shifting force is relatively far.

Conventionally, in order to transmit a shifting force from a driver to the transmission, two separate forces, applied in two directions, are required. These forces are combined to shift the transmission into gear in multiple stages. In other words, two forces are respectively transmitted to the transmission. One force selects the operation, where a shift lever is manipulated to left and/or right directions from a driver's seat to select one of the 1 or 2, 3 or 4 and 5 or R gears. The second force shifts into gear where the shift lever is manipulated forward or backward to shift into the selected gear. Typically, the forces are transmitted to the transmission via respective link structures where two different link structures are required to shift the transmission into gear from a shift lever to the transmission.

Such manual shifting devices, however, require two almost identically-structured link members, thereby increasing the number of parts, making it more difficult to operate, increasing maintenance, and decreasing the effect of the shifting force.

SUMMARY OF THE INVENTION

The present invention provides a manual transmission shifting device, which is simply constructed to enable smoother transfer of a shifting force from a driver to the transmission via a single linking mechanism. This reduces manufacturing and assembly time, reduces maintenance and increases the effect of the shifting force.

In one embodiment of the invention, the manual transmission shifting device comprises a lever mechanism coupled to a transmission. The lever mechanism is used to perform a gear selecting operation and a gear shifting operation. A first rod is mounted at one end thereof to a lower end of a shift lever at a driver's seat. The first rod is configured to be rotated by the gear selecting operation of the shift lever, and is configured to be moved longitudinally by the gear shifting operation of the shift lever. A selecting linear movement converter converts a rotating force of the first rod to a linear movement in a perpendicular direction. A selecting link mechanism linearly moves the lever member by using the force from the selecting linear movement converter. A shifting rotation converter converts the longitudinal movement of the first rod to rotational force. A shifting link mechanism rotates the lever mechanism using the rotational force of the shifting rotation converter.

According to another embodiment of the invention there is provided another manual transmission shifting device. This manual transmission shifting device includes a lever mechanism, a shift lever, a rod, and a mechanical link system. The lever mechanism is coupled to a manual transmission and configured to transmit a gear selection operation and a gear shifting operation to the transmission. The shift lever configured to receive a gear selection force and a gear shifting force from an operator. The rod is coupled to the shift lever and configured to convert the gear selection force into a rotation of the rod about its longitudinal axis. The rod is also configured to convert the gear shifting force into a linear motion of the rod along its longitudinal axis. The mechanical link system is coupled between the rod and the lever mechanism. The mechanical link system is configured to convert the rotation into the gear selection operation. The mechanical link system is also configured to convert the linear motion into the gear shifting operation.

The mechanical link system preferably includes a selecting linear motion converter, a selecting link mechanism, a shifting rotation converter, and a shifting link mechanism. The selecting linear motion converter is configured to convert the rotation into a lateral motion. The selecting link mechanism is configured to convert the lateral force into a linear translation force at the lever mechanism. The shifting rotation converter configured to convert the linear motion into a circular motion. The shifting link mechanism configured to convert the circular motion into a rotation at the lever mechanism. The lever mechanism preferably further includes a manipulated lever integrally formed with a linear movement arm so formed as to be linearly moved by way of the selecting link mechanism and a rotating arm rotated by the shifting link mechanism. The lever mechanism also preferably includes a shift lever coupled to the transmission. The shift lever is configured to linearly move and rotate according to the manipulated lever to perform the gear selection operation and the gear shifting operation.

BRIEF DESCRIPTION OF THE DRAWINGS

For a better understanding of the nature and objects of the invention, reference should be made to the following detailed descriptions taken in conjunction with the accompanying drawings in which.

DETAILED DESCRIPTION OF THE INVENTION

Figure 2:
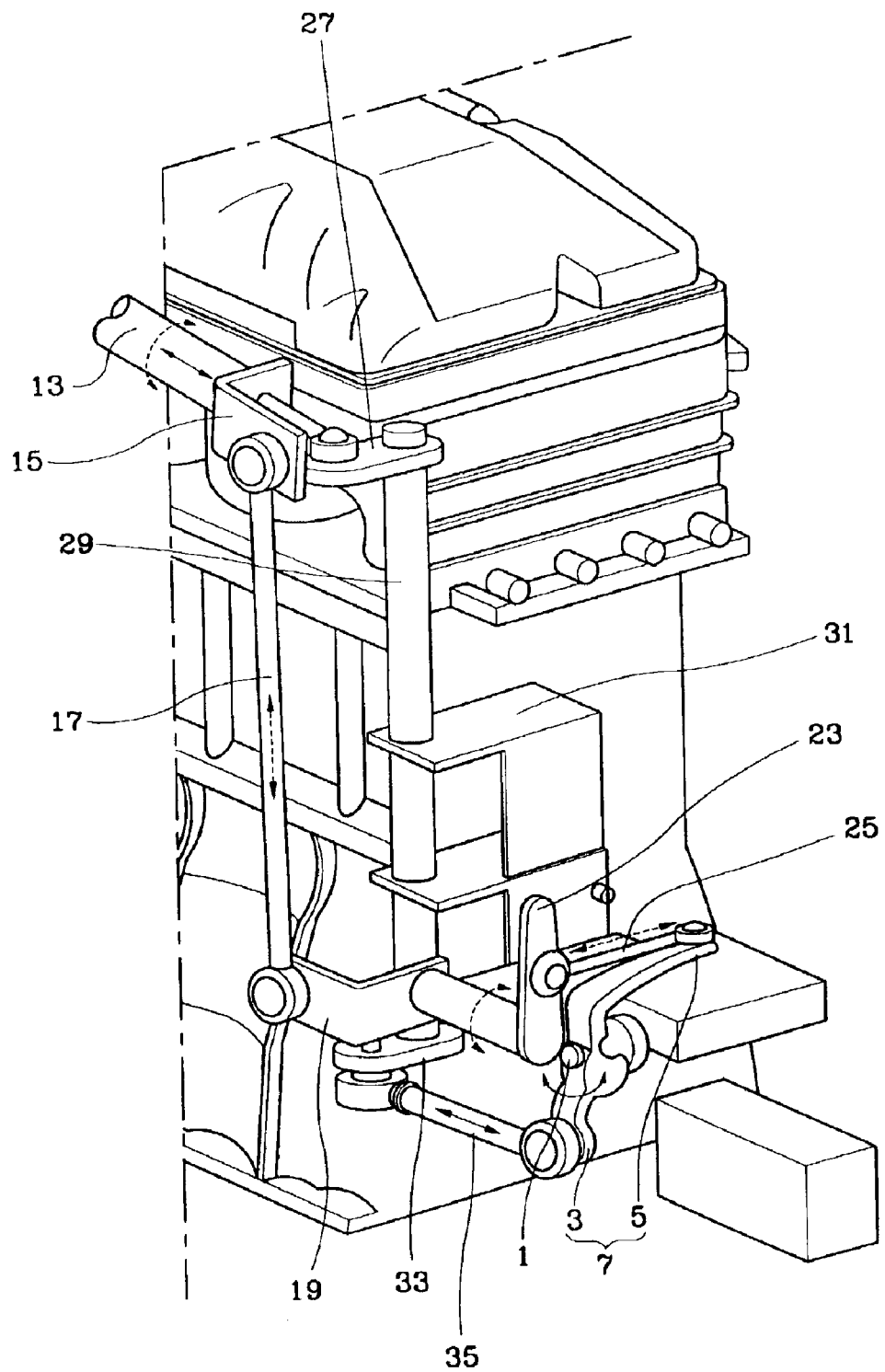
FIG. 2 is a detailed perspective view of a manipulating part at the side of a transmission shown in FIG. 1.
Figure 3:
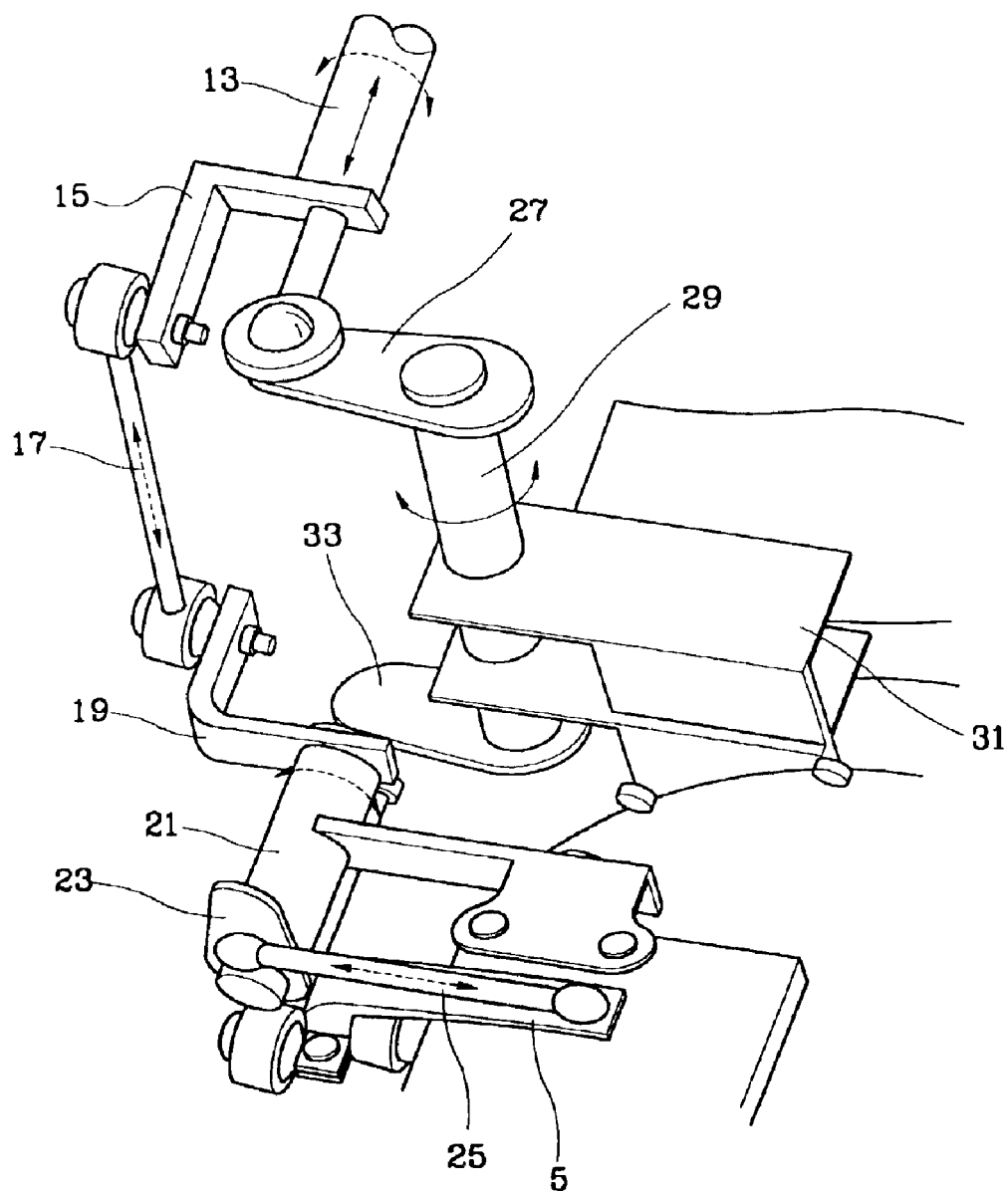
FIG. 3 is a perspective view of an upper structure shown in FIG. 2, at a different angle.
Figure 4:
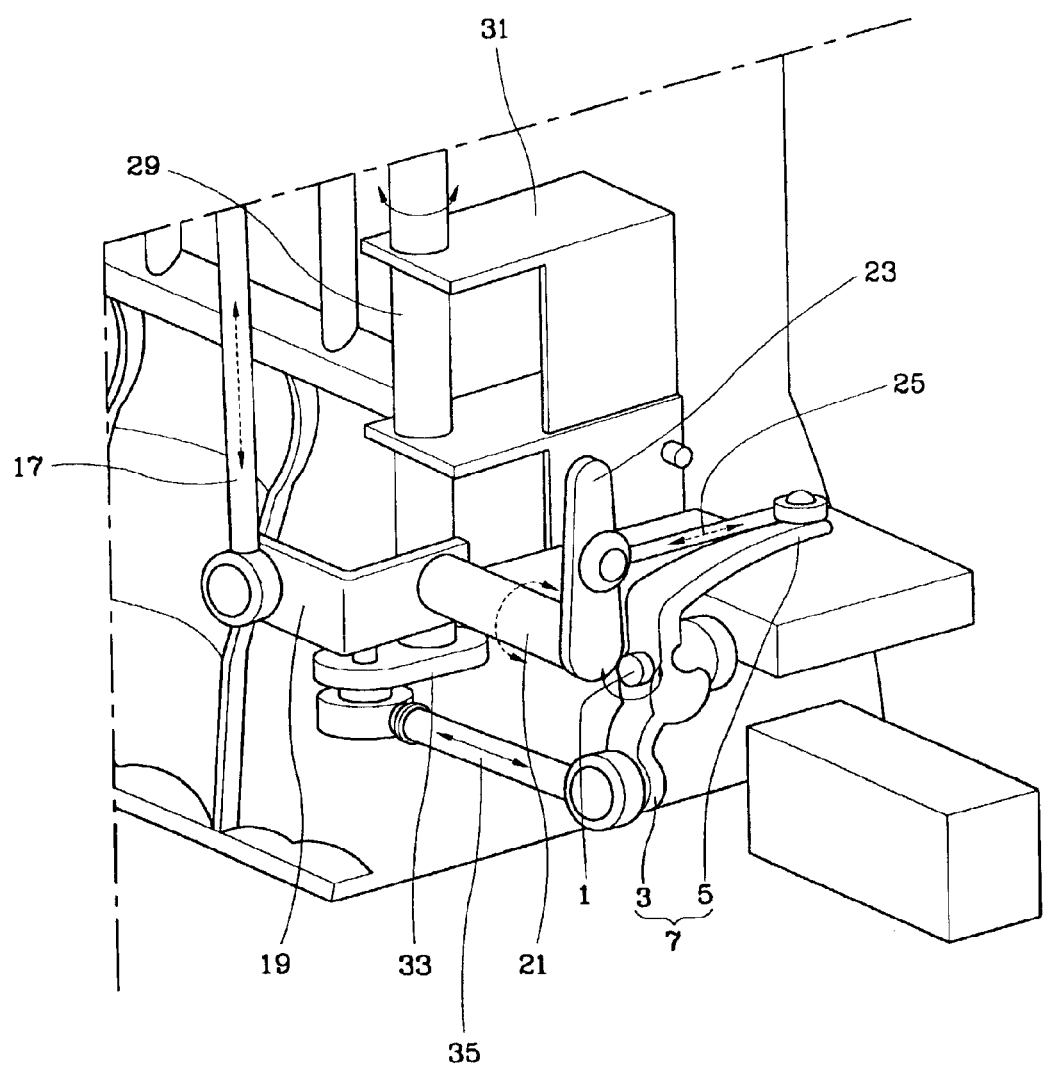
FIG. 4 is a further detailed perspective view of a lower structure shown in FIG. 2.

As shown in FIGS. 2, 3 and 4, a lever mechanism is coupled to a transmission. The lever mechanism is configured for selecting and shifting into a gear. The lever mechanism includes a shift lever 1 at the side of the transmission for performing a gear selection operation in response to a linear movement, and for performing a gear shifting operation in response to rotation. The lever mechanism also includes a manipulated lever 7 mounted at the shift lever 1 at the side of the transmission, including a rotating arm 3 and a linear movement arm 5.

Figure 1:
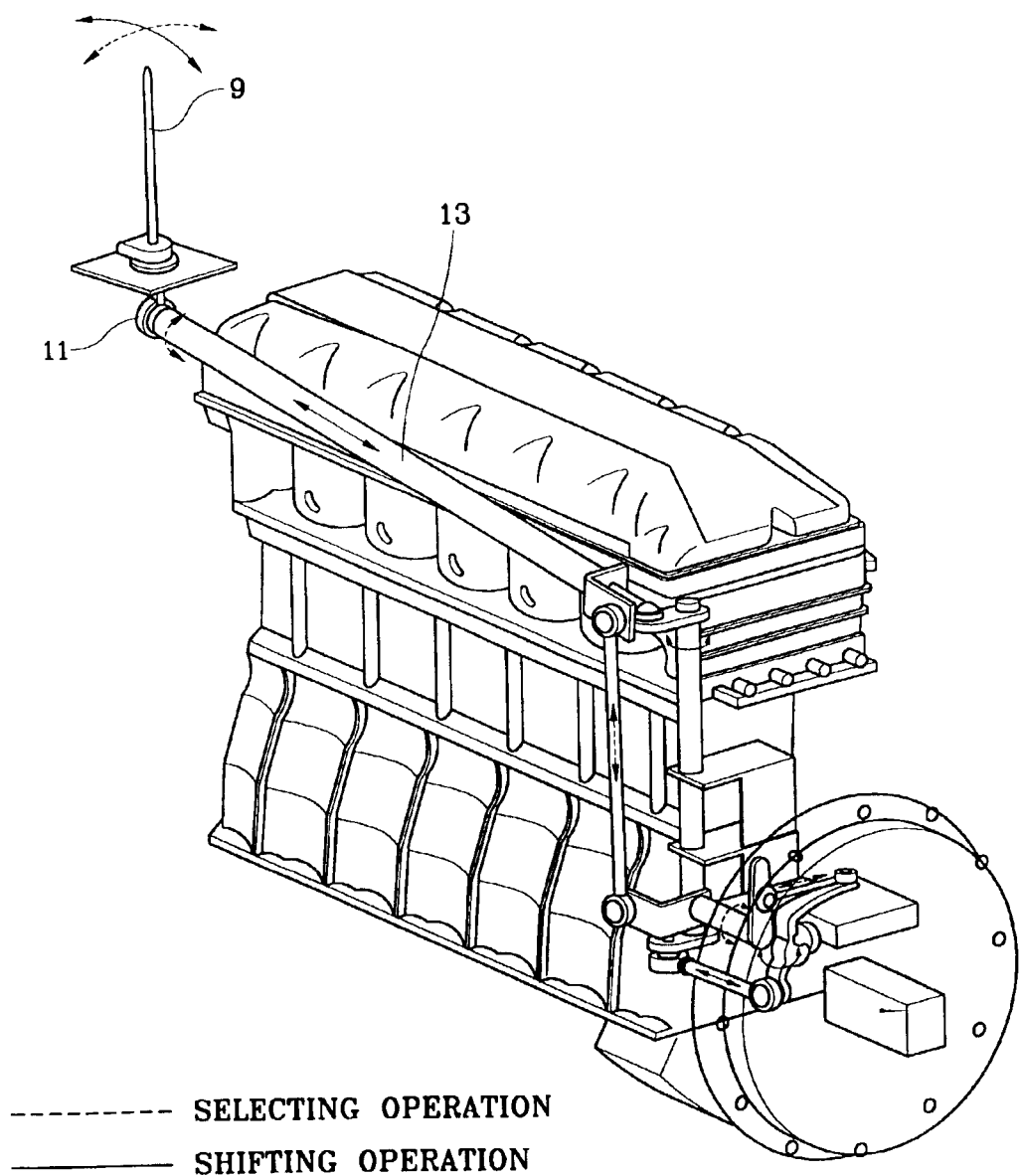
FIG. 1 is a perspective view of a manual transmission shifting device, according to an embodiment of the present invention.

A shifting force from a shift lever 9 (FIG. 1) near the driver's seat is transmitted through a mechanical link system to the levers 1 and 7. The mechanical link system includes a first rod 13, a selecting line motion converter, a selecting link mechanism, a shifting rotation converter, and a shifting link mechanism.

The first rod 13 is coupled at one end thereof to a lower end of the shift lever 9 near the driver's seat (coupled via a "U" joint 11 in the present embodiment). The first rod is configured to be rotated by a gear selecting operation of the shift lever 9, and for being longitudinally tranlated by a gear shifting operation of the shift lever 9.

The selecting linear motion converter is configured for converting a rotational force of the first rod 13 into linear motion in a perpendicular direction. The selecting linear motion converter includes a first selecting lever 15 integrally coupled to the first rod 13 to form a rotating arm. The selecting linear motion converter also includes a second selecting rod 17 connected to the first selecting lever 15 via a ball joint. The first selecting lever 15 is preferably "L" shaped, integrally coupled to the first rod 13, and formed at one surface thereof with a receiving portion into which a ball provided at an upper end of the second selecting rod 17 can be inserted.

The selecting link mechanism is configured for linearly translating the shift lever 1 by using the force from the selection linear motion converter. The selecting link mechanism is comprised of a second selecting lever 19 coupled via a ball joint to a lower end of the second selecting rod 17. The selecting link mechanism also includes a third selecting rod 21 for providing a rotary axle of the second selecting lever 19 and for being rotatably supported at a transmission case. The selecting link mechanism further includes a third selecting lever 23 coupled to the third selecting rod 21 to form a rotating arm, and a fourth selecting rod 25 for being coupled at one end thereof to the third selecting lever 23 via a ball joint and for being coupled at the other end thereof to a linear movement arm 5 of the manipulated lever 7. A longitudinal orientation of the fourth selecting rod 25 is preferably parallel with the lengthwise direction of the shift lever 1 at the side of the transmission.

The shifting rotation converter is configured for converting the longitudinal motion of the first rod to a rotational force. The shifting rotation converter for transmitting the gear shifting operation includes a first shifting lever 27 coupled to an end of the first rod 13 via a ball joint, and a second shifting rod 29. The second shifting rod provides a rotatable axle of the first shifting lever 27. The shifting rotation converter also includes a support bracket 31 secured to the side of the transmission side to rotatably support the second shifting rod 29.

The shifting link mechanism is configured for rotating the shift lever 1 by using the rotational force of the shifting rotation converter. The shifting link mechanism comprises a second shifting lever 33 coupled to the second shifting rod 29 to form a rotating arm, and a third shifting rod 35 couples at one end thereof to the second shifting lever 33 via a ball joint and coupled at the other end thereof to a rotating arm 3 of the manipulated lever 7 via a ball joint. The longitudinal direction of the third shifting rod 35 is perpendicular to the lengthwise direction of the shift lever 1.

When a driver initiates a gear selection operation, the first rod 13 connected to the shift lever 9 via the "U" joint 11 is rotated to linearly move the shift lever 1 next to the transmission via the selecting linear movement converter and the selecting link mechanism. In other words, the first selecting lever 15 is rotated by the rotating force of the first rod 13. This causes the second selecting rod 17 to move linearly in a vertical direction. The linear movement of the second selecting rod 17 is changed to a rotation by the second selecting lever 19. The fourth selecting rod 25 translates linearly, caused by rotation of the third selecting rod 21. This causes the shift lever 1 at the side of the transmission to linearly move along a longitudinal direction via the manipulated lever 7, thereby performing the gear selection operation.

For performing the gear shifting operation, the first rod 13 is longitudinally moved by manipulation of the shift lever 9. This motion is transmitted to the shift lever 1 via the shifting rotation converter and the shifting link mechanism as a rotational force. In other words, a longitudinal movement of the first rod 13 is converted to rotational force by the first shifting lever 27 to be transmitted to the second shifting rod 29. As a result, the second shift lever 33 coupled to the second shifting rod 29 is rotated, causing the third shifting rod 35, connected to it via a ball joint, to linearly translate. The linear movement of the third shifting rod 35 in turn rotates the rotating arm 3 of the manipulated lever 7, thereby rotating the shift lever 1 and completing the gear shifting operation.

Of course, the gear shifting operation and the gear selection operation described above have no influence upon each other's operation because the above-mentioned mechanisms are independently operated.

Accordingly, shifting force is transmitted only by the first rod from the shift lever to the transmission and the shifting force transmitted to the first rod is supplied to the transmission via a simple structure, such that the number of components and work processes can be reduced. This improves the efficiency of transmitting the shifter's force to the manual transmission by a driver.

What is claimed is:

1. A manual transmission shifting device, the device comprising:

a lever mechanism coupled to a transmission and configured to perform a gear selection operation and a gear shifting operation;

a first rod mounted at one end thereof to a lower end of a shift lever where said first rod is configured to be rotated by the gear selection operation of the shift lever and configured to be longitudinally translated by the gear shifting operation of the shift lever;

a selecting linear motion converter configured for converting rotation of the first rod into a linear motion;

a selecting link mechanism configured for linearly translating the lever mechanism from a force from the selecting linear motion converter;

a shifting rotation converter configured for converting a longitudinal motion of the first rod into a rotational force; and a shifting link mechanism for rotating the lever mechanism from a rotational force of the shifting rotation converter.

2. The device as defined in claim 1, wherein the lever mechanism comprises:

a manipulated lever integrally formed with a linear movement arm so formed as to be linearly moved by way of the selecting link mechanism and a rotating arm rotated by the shifting link mechanism; and a shift lever coupled to the transmission for linearly moving and rotating according to the manipulated lever to perform the gear selection operation and the gear shifting operation.

3. The device as defined in claim 1, wherein the first rod is coupled to a lower end of the shift lever via a "U" joint.

4. The device as defined in claim 1, wherein the selecting linear motion converter comprises:
- a first selecting lever integrally coupled to the first rod to from a rotating arm; and
- a second selecting rod connected to the first selecting lever via a ball joint.

5. The device as defined in claim 4, wherein the selecting link mechanism comprises:
- a second selecting lever coupled via a ball joint to a lower end of the second selecting rod;
- a third selecting rod configured for providing a rotary axle of the second selecting lever and for being rotatably supported at the transmission case;
- a third selecting lever coupled to the third selecting rod functioning as a rotating arm; and
- a fourth selecting rod coupled at one end thereof to the third selecting lever via a ball joint and coupled at another end thereof to a linear movement arm of the manipulated lever while longitudinal direction thereof is parallel with the lengthwise direction of the shift lever at the transmission gear box.

6. The device as defined in claim 1, wherein the shifting rotation converter comprises:
- a first shifting lever coupled to an end of the first rod via a ball joint;
- a second shifting rod configured for providing a rotating axle of the first shifting lever and disposed in a perpendicular direction; and
- a support bracket secured to the transmission to support rotation of the second shifting rod.

7. The device as defined in claim 6, wherein the shifting link mechanism comprises;
- a second shifting lever coupled to the second shifting rod to form a rotating arm; and
- a third shifting rod connected at one end thereof to the second shifting lever via a ball joint and connected at another end thereof to a rotating arm of the manipulated lever via a ball joint while longitudinal direction thereof is perpendicular to the lengthwise direction of the shift lever.

8. A manual transmission shifting device, comprising:
- a lever mechanism coupled to a manual transmission and configured to transmit a gear selection operation and a gear shifting operation to said transmission;
- a shift lever configured to receive a gear selection force and a gear shifting force from an operator;
- a rod coupled to said shift lever and configured to convert said gear selection force into a rotation of said rod about its longitudinal axis, and configured to convert said gear shifting force into a linear motion of said rod along its longitudinal axis; and
- a mechanical link system coupled between said rod and said lever mechanism, where said mechanical link system is configured to convert said rotation into said gear selection operation, and configured to convert said linear motion into said gear shifting operation, wherein said mechanical link system further comprises:
- a selecting linear motion converter configured to convert said rotation into a lateral motion;
- a selecting link mechanism configured to convert said lateral force into a linear translation force at said lever mechanism;
- a shifting rotation converter configured to convert said linear motion into a circular motion; and
- a shifting link mechanism configured to convert said circular motion into a rotation at said lever mechanism.

9. The manual transmission of claim 8, wherein lever mechanism further comprises:
- a manipulated lever integrally formed with a linear movement arm so formed as to be linearly moved by way of the selecting link mechanism and a rotating arm rotated by the shifting link mechanism; and
- a shift lever coupled to the transmission for linearly moving and rotating according to the manipulated lever to perform the gear selection operation and the gear shifting operation.

10. The device as defined in claim 8, wherein the rod is coupled to a lower end of the shift lever via a U joint.

11. The device as defined in claim 8, wherein the selecting linear motion converter comprises:
- a first selecting lever integrally coupled to the rod to from a rotating arm; and
- a second selecting rod connected to the first selecting lever via a ball joint.

12. The device as defined in claim 11, wherein the selecting link mechanism further comprises:
- a second selecting lever coupled via a fall joint to a lower end of the second selecting rod;
- a third selecting rod for providing a rotary axle of the second selecting lever and for being rotatably supported at said transmission;
- a third selecting lever coupled to the third selecting rod functioning as a rotating arm; and
- a fourth selecting rod coupled at one end thereof to the third selecting lever via a ball joint and coupled at another end thereof to a linear movement arm of the manipulated lever while longitudinal direction thereof is parallel with the lengthwise direction of the shift lever at the transmission gear box.

13. The device as defined in claim 12, wherein the shifting rotation converter comprises:
- a first shifting lever coupled to an end of the first rod via a ball joint;
- a second shifting rod configured to provide a rotating axle of the first shifting lever; and
- a support bracket secured to the transmission to support rotation of the second shifting rod.

14. The device as defined in claim 13, wherein the shifting link mechanism comprises;
- a second shifting lever coupled to the second shifting rod to form a rotating arm; and
- a third shifting rod connected at one end thereof to the second shifting lever via a ball joint and for being connected at another end thereof to a rotating arm of the manipulated lever via a ball joint while longitudinal direction thereof is perpendicular to the lengthwise direction of the shift lever.

* * * * *